(No Model.) 2 Sheets—Sheet 1.

C. H. BRACE.
SIGNALING SYSTEM.

No. 534,779. Patented Feb. 26, 1895.

WITNESSES:
H. H. Hale
H. L. Brown

INVENTOR
Clarence H. Brace
By his atty.
Oscar Snell (No Model.)  2 Sheets—Sheet 2.

C. H. BRACE.
SIGNALING SYSTEM.

No. 534,779. Patented Feb. 26, 1895.

WITNESSES:
H. H. Hale
H. L. Brown

INVENTOR:
Clarence H. Brace
By his atty.
Oscar Snell

UNITED STATES PATENT OFFICE.

CLARENCE H. BRACE, OF UNION CITY, MICHIGAN.

SIGNALING SYSTEM.

SPECIFICATION forming part of Letters Patent No. 534,779, dated February 26, 1895.

Application filed November 27, 1894. Serial No. 530,113. (No model.)

*To all whom it may concern:*

Be it known that I, CLARENCE H. BRACE, a citizen of the United States, residing at Union City, in the county of Branch and State of Michigan, have invented a new and useful Signaling System, of which the following is a specification.

This invention relates to signaling apparatus, and my objects are to provide means for the purpose which may be quickly and easily set for a great number of different signals without the usual annoyance incident to ordinary apparatus of this kind, the principal feature of my new invention being so arranged that the ordinary step by step movement is entirely obviated; there being a continuous but limited transmission of power in operating a detent at the proper times to permit the signal wheel to display any figure, letter, or other device which may be used to convey intelligence; a signal bell being sounded during the display of the signal, and continuing to sound until cut out of connection with an electric battery or other source of power by proper devices operated by the signal wheel when it is returned to zero or the initial point, all of which is described hereinafter, and is illustrated in the accompanying drawings, in which—

Figure 1:
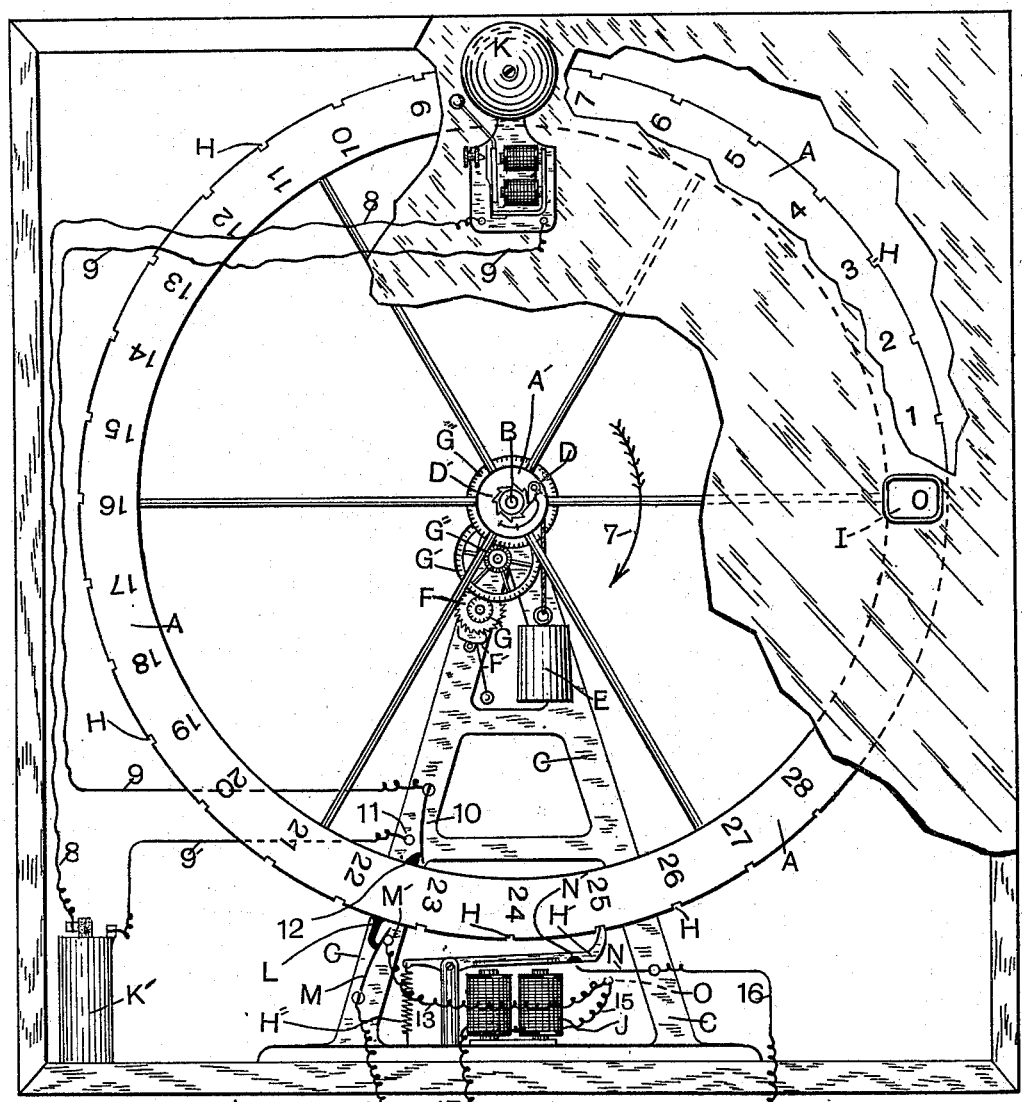
Figure 2:
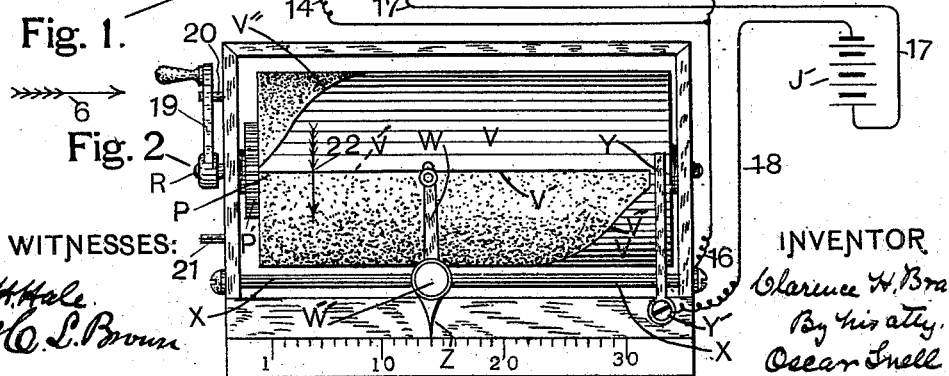
Figure 3:
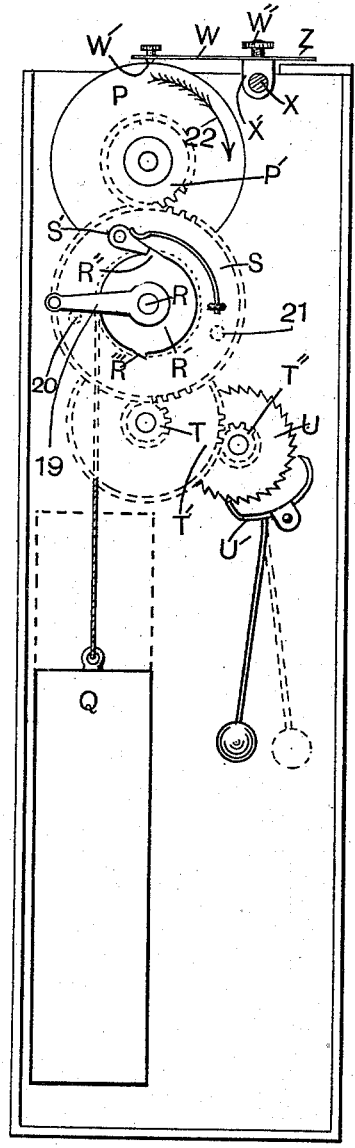
Figure 4:
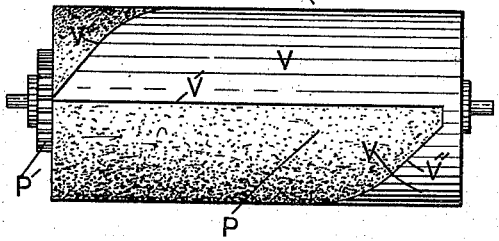
Figure 5:
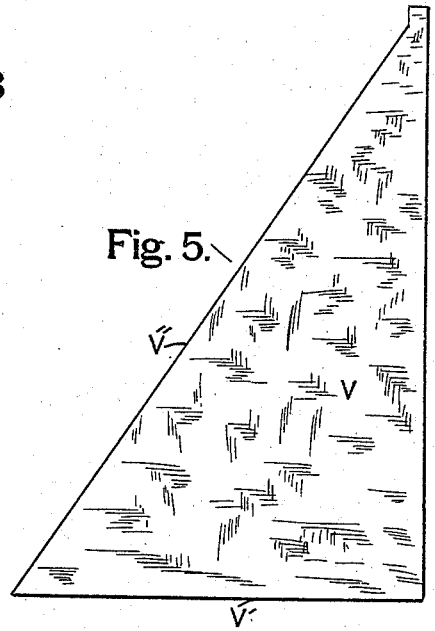

Figure 1 is a front elevation of a portion of the apparatus with the greater part of the front cover removed, to show the signal wheel and operating mechanism therefor, an electro magnet being employed in this instance to operate the starting and stopping detent. Fig. 2 is a plan of the electrical transmitter, the battery connection, and the connection between the transmitter and the signal box detent magnet being also shown. Fig. 3 is an elevation of one end of the transmitting apparatus, Fig. 2, with the end of the case removed, looking in the direction indicated by arrow 6, Fig. 2. Fig. 4 is a plan of the transmitter cylinder, showing a portion of the surface shaded with dots to represent a non-conductor of electricity, while the other portions of the peripheral surface are shaded with solid lines, to represent an electrical conductor, which, of sheet metal, is shown in Fig. 5, as it appears when spread out flat after being removed from the cylinder shown in Fig. 4.

Similar letters and numerals indicate like parts throughout the several views.

A is a wheel which is loosely mounted upon a shaft whose front end is seen at B, this shaft being journaled to revolve at the top of a stand C, the boss A' of the wheel A being provided with a pawl D which engages a ratchet wheel D' secured to shaft B so that, when wheel A is rotated in the direction indicated by arrow 7, by the gravity of weight E suspended from boss A', shaft B is also revolved, but this shaft remains stationary when wheel A moves in the opposite direction, above stated, since pawl D will slip backwardly over the teeth of the ratchet. Wheel A, when moving in the direction indicated by arrow 7, moves regularly by virtue of the action of the common form of escapement device F and F', which is geared to shaft B through the train of cog wheels indicated by G, G', G'' and G'''. Wheel A, in this instance, is provided with a series of numerals affixed to the vertical face thereof at the rim, and there are stops or notches H at the peripheral edge of the rim, which are engaged by the detent H', to stop the wheel with some one of the numerals in view at the small window I, Fig. 1. Detent H' is drawn out of engagement with stops H, against the pull of spring H'', by virtue of electro magnet J, whose armature is attached to this detent.

At K is an electric alarm bell whose magnet is connected with battery K through wires 8, 9 and 9', the circuit being established through spring 10 when in contact with pin 11, this spring being held out of such contact by projection 12, when wheel A is at the initial position with a cipher at the window I, as shown in Fig. 1, but always in contact when wheel A has moved so as to show any of the numerals at window I.

At L is a projection from the periphery of wheel A which serves when in contact with spring M as a stop to arrest the motion of wheel A when returning to the initial position, and also serves to hold spring M in contact with pin M', and thereby establish a connection between wires 13 and 14. At N is a spring connection whose free end is under a piece of insulating material N' attached to detent H', which spring establishes connection between wires 15 and 16 when detent H' is drawn down by magnet J out of a notch of wheel A, the spring then contacting pin O. Wire 17 connects electro-magnet J with one of the poles of battery J'.

The parts hereinbefore particularly designated comprise the operative mechanism of the signal box, the transmitting mechanism being shown in Figs. 2 and 3.

At P is a cylinder which is journaled at the ends to revolve by the gravity of weight Q, which is hung by a cord to a pulley attached to another shaft R which has attached thereto a ratchet wheel R' which has two teeth, R'' and R''', disposed on diametrically opposite sides; and there is a pawl S' attached to cog wheel S which engages these teeth and communicates motion from shaft R to cylinder P through cog wheel S to cog wheel P', which latter wheel is secured to cylinder P.

At T, T' and T'' are cog wheels which connect the escapement mechanism U and U' with cog wheel S so that, cylinder P is revolved with a regular motion, and in unison with the revolution of signal wheel A.

Secured around the periphery of cylinder P is the transmitter, metal contact V, which when spread out flat is triangular in shape, Fig. 5, one edge V' being preferably straight and disposed parallel with the axis of the cylinder, the opposite edge V'' forming substantially a spiral line around the cylinder.

At Y is a spring brush having one end touching the contact plate V, while the other end is held by means of a screw Y'.

The rod X is of metal, and forms the support for the boss X' of a spring brush W having a contact point W' which may be shifted longitudinally of the cylinder or rod X, and held by screw W'' so as to contact any part of contact plate V between the numerals 1 and 30 of the scale shown in Fig. 2.

The brush Y is in connection with battery J' through wire 18; and brush W is in connection with the detent magnet J at the signal box, Fig. 1, through wire 16 and rod X to which this wire is attached at the outside of the signal box, Fig. 2.

The operative parts are all shown in the initial position, in the drawings, with the indicator Z at the signal box pointing to 14, and the crank 19 resting upon stop pin 20, Figs. 2 and 3. If now, crank 19 is turned from left to right until arrested by contact with pin 21, weight Q will be lifted to the position shown in the broken lines, when pawl S' will fall into engagement with tooth R''' of ratchet wheel R, when if hold is loosened upon the crank the weight Q will cause the crank to slowly revolve backwardly until it again rests upon stop pin 20, but in the mean time the cylinder P will have made a complete revolution in the direction indicated by arrow 22, because cog wheel S is double the size of cog wheel P', the revolution of the cylinder causing the contact plate V to slide under and in contact with point W' of spring brush W, and transmit a current of electricity from the battery J' through wire 18, brush Y, plate V, brush W, rod X, wire 16, wire 14, spring M, wire 13 and wire 15 to electro magnet J, thence by wire 17 to the opposite pole of the battery from wire 18, the action of the magnet drawing detent H' from its notch in wheel A, when the wheel will start to revolve by gravity of weight E; but as wheel A starts to revolve spring M lifts from contact with pin M', and breaks the circuit as above described, but the circuit is again instantly closed by the detent H' being drawn down which causes spring N to contact pin O when the current of electicity from wire 16 is switched from wires 14 and 13, directly to the magnet through wire 15, and will continue to hold the detent out of engagement with the signal wheel stops H, until the current is cut off by the contact strip V passing entirely under and out of contact with point W' of brush W, when detent H' by the action of spring H'' will engage with another stop of wheel A, and the number 14 appear at the window I. The cylinder P, however, continues to revolve until it makes a complete revolution with the crank 19 again resting upon the pin 20, and the contact point W' near to but not touching the contact plate V. In the mean time, at the start of the forward revolution of signal wheel A the projection 12 moves away and permits spring 10 to contact pin 11, which closes the circuit of battery K' through the magnet of bell K, and an alarm is sounded continuously until wheel A is again returned to the initial position, when the several parts will assume the relative positions shown in the drawings.

It is obvious that, should the motion of the signal wheel A and cylinder P be so regulated as to be in unison, the extent of the movement of the signal wheel will be limited by the extent of time the point W' is in contact with plate V and that, by sliding the brush W along rod X, which is longitudinal of cylinder P, the length of time of contact may be varied as may be desired to arrest wheel A in a movement not to exceed the distance of one stop H from another, or for the distance equal to several or all the stops from the initial point, and thus any desired character on wheel A may be presented at the window I.

After the signal has been observed by the attendant at the receiving station the wheel A is turned backwardly, which is in the direction opposite to that indicated by arrow 7, until projection L touches spring M and causes it to contact pin M, and projection 12 touches spring 10 and draws it out of contact with pin 11 and thereby stops the ringing of bell K. The shape of the contacting end of detent H' is such that wheel A may be revolved backwardly, the rear beveled face of the detent permitting it to slide out of the stop notches H, but to hold the wheel from movement in the forward direction. The reason for employing the two spring connections M and N, which serve in part for the same purpose is that: it is intended to connect as many transmitters, Fig. 2, with one signal wheel as there are numbers thereon, each transmitter representing, and is placed in, some distant and independent station widely separated from all the other stations, and should any person endeavor to signal after another person has signaled, and before the signal wheel is turned back to the initial point it will be impossible, because, the detent H' will then have a position, same as shown in Fig. 1, with the spring N out of contact with pin O, and then, since the stop projection L in any other but the initial position is removed from contact with spring connection M it is obvious that, the detent magnet J is cut out from all the stations in the series, including the station from which the signal wheel was last operated, so that, it is impossible to send two signals to be indicated by the wheel at the same time.

I claim as my invention—

1. The combination in an electrical signaling system having a series of movable signal characters for conveying intelligence, and a series of stops respectively registering with such characters, and a detent, operated by an electro-magnet, adapted to engage any one of the stops at the receiving station, of means at the sending station in the circuit of the said detent electro-magnet adapted to continuously close the circuit and thereby disengage the detent, and then open the circuit and re-engage the detent, there being a length of time between the opening and closing of the circuit equal to that required for arresting the movement of the said characters at some designated position, for the purpose stated.

2. The combination in an electrical signaling system having a series of movable signal characters for conveying intelligence, and a series of stops, respectively, registering with such characters, and a detent, operated by an electro-magnet, adapted to engage any one of the stops at the receiving station, of means at the sending station in the circuit of the said electro-magnet comprising a circuit closer consisting of a triangular movable electrical conductor, the movement thereof practically isochronal with the movement of the signal characters, in combination with a stationary contact point adapted to contact the moving conductor and close the circuit and then open the same in the manner and for the purpose substantially as shown and described.

3. The combination in an electrical signaling system having at the receiving station a series of movable signal characters for conveying intelligence, and a series of stops respectively registering with such characters, and a detent operated by an electro-magnet adapted to engage any one of the stops, of means for cutting out, during the display of a signal, electrical connection between the detent electro-magnet and the sending station, said means comprising a double circuit connecting the detent electro-magnet with the sending station, a connector normally closing the first circuit with the signal characters at the initial position, and adapted to open this circuit at the beginning of the movement of the signal characters from initial position, the second circuit being closed by means of a connector simultaneously with the opening of the first circuit, the connector of the second circuit operating to cut out all electrical connection between the sending station and the detent electro magnet during the display of a signal, substantially as stated.

In testimony that I claim the foregoing I have hereunto set my hand, this 15th day of November, 1894, in the presence of witnesses.

CLARENCE H. BRACE.

Witnesses:
OSCAR SNELL,
H. L. BROWN.